United States Patent

Wickramanayake

Patent Number: 5,342,440
Date of Patent: Aug. 30, 1994

[54] BLACK-TO-COLOR BLEED CONTROL IN THERMAL INK-JET PRINTING

[75] Inventor: Palitha Wickramanayake, Corvallis, Oreg.

[73] Assignee: Hewlett-Packard Corporation, Palo Alto, Calif.

[21] Appl. No.: 967,082

[22] Filed: Oct. 26, 1992

[51] Int. Cl.⁵ ............................................. C09D 11/02
[52] U.S. Cl. ................... 106/22 R; 106/22 H; 106/22 E
[58] Field of Search ................ 106/22 R, 22 H, 22 E, 106/22 K

[56] References Cited

U.S. PATENT DOCUMENTS

| | | | |
|---|---|---|---|
| 4,425,162 | 1/1984 | Sugiyama et al. | 106/22 K |
| 4,505,749 | 3/1985 | Kanekiyo et al. | 106/22 R |
| 4,533,920 | 8/1985 | Suzuki | 106/22 R |
| 4,818,285 | 4/1989 | Causley et al. | 106/20 D |
| 4,864,324 | 9/1989 | Shirota et al. | 106/22 D |
| 5,017,227 | 5/1991 | Koike et al. | 106/22 C |
| 5,133,803 | 7/1992 | Moffatt | 106/22 F |
| 5,198,023 | 3/1993 | Stoffel | 106/22 R |
| 5,226,957 | 7/1993 | Wickramanayake et al. | 106/22 E |
| 5,273,573 | 12/1993 | Kappele | 106/22 R |

*Primary Examiner*—Helene Klemanski

[57] ABSTRACT

Water-insoluble black dyes are formulated in a microemulsion-based ink. When printed adjacent to color inks (yellow, magenta, cyan) containing water-soluble dyes, bleed does not occur between the black and the color dyes.

15 Claims, No Drawings

BLACK-TO-COLOR BLEED CONTROL IN THERMAL INK-JET PRINTING

TECHNICAL FIELD

The present invention relates generally to ink compositions and processes for making the same for use in ink-jet printers, and, more specifically, to the use of water-soluble and water-insoluble dyes in aqueous ink formulations for thermal ink-jet printing.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current-carrying signals cause one or more selected elements to heat up. The heating creates a bubble in the chamber, which expels ink through the nozzle toward the print medium. In this way, firing of a plurality of such resistor elements in a particular order in a given primitive forms alphanumeric characters, performs area-fill, and provides other print capabilities on the medium.

Many inks that are described for use in ink-jet printing are usually associated with non-thermal ink-jet printing. An example of such non-thermal ink-jet printing is piezoelectric ink-jet printing, which employs a piezoelectric element to expel droplets of ink onto the print medium. Inks suitably employed in such non-thermal applications often cannot be used in thermal ink-jet printing, due to the effects of heating on the ink composition.

Two inks made using water-soluble dyes, when printed next to each other, tend to bleed and also give reduced waterfastness. Bleed, as used herein, refers to the mutual dye diffusion that takes place when one ink dot is placed next to another on the print medium. If the two dots contain dyes of different hues, then the phenomenon is called color bleed, and is highly undesirable in ink-jet printing.

Bleed control has been accomplished in different ways: (a) printer techniques, where dots are separated, or placed with time lags in between printing adjacent dots; (b) use of fast drying inks where time for ink diffusion is minimal; and (c) use of heater and/or blowers to accelerate drying are examples of some of them.

The use of printer techniques requires complex algorithms in printer control. They slow down the printer throughput. Fast drying inks often do not give satisfactory bleed control due to their tendency to spread on the print media. Heated platens add cost and complexity to the printer.

Microemulsions, which may be defined as thermodynamically stable isotropic "solutions" of water, oil, surfactant, and cosurfactant, have been used to solubilize water-insoluble dyes for ink-jet printing in the past. The function of water is to provide a continuous phase for the microemulsion droplets and it facilitates the formation of microemulsion droplets by entropic means. The oil is a water-insoluble substance which resides primarily in the microemulsion droplets—the discontinuous phase. The surfactant is an amphipathic, surface active, self-aggregating species which is primarily responsible for the formation of microemulsion droplets. The cosurfactant is also an amphipathic species which significantly concentrates in the microemulsion droplets and it affords stability to the droplets.

Cosolvent, a term commonly used in ink-jet technology, refers to a water-miscible solvent having a vapor pressure that is considerably lower than that of water. Cosolvents are usually added to prevent nozzle clogging. Certain cosolvents, however, may also stabilize microemulsion droplets.

The success of microemulsion-based inks has been limited due to the extent of threading or feathering in the resulting print sample. Apparently, the combination of high organic solvent and surfactant concentrations used in these inks causes extensive wetting of the paper fibers and fillers, resulting in feathering; poor edge acuity is the end result.

Attempts have been made to overcome such print quality deficiencies by the use of microemulsion-based inks that are solids at ambient temperatures, but are liquids at elevated temperatures (e.g., 70° C.); see, e.g., U.S. Pat. No. 5,047,084. These inks, however, place additional demands on the printhead and the printer, such as pre-heaters to keep the ink in liquid form prior to firing, and rollers to flatten the solid ink droplets (lenslets) that are formed on the print medium, thus making the product more complex and costly.

A related patent application, Ser. No. 07/853,471, filed Mar. 18, 1992, and assigned to the same assignee as the present application, discloses and claims microemulsion-based inks which incorporate water-insoluble dyes. These inks have true waterfastness, are non-threading, and are bleed-alleviated. The ink-jet inks have a formula comprising: (a) about 0.05 to 0.75 wt % of a high molecular weight colloid; (b) about 0.1 to 40 wt % of at least two surfactants, comprising at least one surfactant and at least one cosurfactant; (c) about 0.5 to 20 wt % of at least one cosolvent; (d) about 0.1 to 5 wt % of at least one water-insoluble dye; (e) about 0.1 to 20 wt % of an oil; and (f) the balance water. These inks form a stable microemulsion, which results in bleed alleviation and excellent line definition.

Commercially available water-insoluble (oil-soluble) color dyes in general do not give the color gamut necessary for ink-jet printing. In part, this is the reason for the current popularity of water-soluble color dyes in ink-jet printing. Such color gamut concerns do not apply to the black dyes. Therefore, an ink set comprising a water-insoluble black dye and water-soluble color dyes would be an attractive approach, if black-to-color bleed were alleviated.

DISCLOSURE OF INVENTION

In accordance with the invention, printing with a thermal ink-jet printer employs a combination of inks in which the black dye is water-insoluble and the other dyes are water-soluble. The soluble dye remains in the aqueous environment, and the insoluble dye, which is "oil" soluble, remains in the "oil" phase until "drying" on the print substrate is complete. Thus, bleed between black and colors is eliminated.

The color set comprises yellow, magenta, and cyan inks, together with black ink. In accordance with the invention, the black ink comprises a water-insoluble black dye in an "oil" phase, which is microemulsified with a surfactant, a cosurfactant, and water. The color set comprises color inks, each including one or more water-soluble dyes, in a vehicle comprising one or more cosolvents and water.

BEST MODES FOR CARRYING OUT THE INVENTION

In accordance with the invention, ink sets are provided in which bleed between black and the colors (yellow, magenta, and cyan), or the secondaries, is eliminated. This is achieved by employing one or more water-insoluble dyes in the black ink and forming a microemulsion of the black ink, while employing one or more water-soluble dyes in each of the color inks.

Black Ink

In forming the microemulsion, the water-insoluble dye is dissolved in an "oil" phase, and then is microemulsified with (a) a surfactant system comprising a surfactant and a cosurfactant, and (b) water. The concentration of the dye ranges from about 0.1 to 6 wt %. The concentration of the surfactant system ranges from about 1 to 35 wt %, with the concentration of the surfactant ranging from about 0.5 to 15 wt % and the concentration of the cosurfactant ranging from about 0.5 to 20 wt %. The concentration of the oil ranges from about 0.5 to 20 wt %. The remainder is water.

Water-insoluble dyes are those dyes which evidence no appreciable dissolution of dye in water at room temperature. A water-insoluble dye, as used herein, is one in which its solubility in aqueous solvent (assuming <20% organic cosolvent) is so small that its optical density on various papers is <0.80. (This definition will vary slightly among paper brands and types, but should differ no more than ±0.2.)

Water-insoluble dyes are most useful in inks in which the property of waterfastness is important, because once such inks are printed on paper, they will not smear in the presence of water. Among the inks, waterfastness of black is the most important, as envelope printing is mostly done with it, and is the case where water spills are most likely to be encountered. Examples of such water-insoluble dyes include solvent dyes, vat dyes, and certain mordant dyes. These dyes are available in a variety of blacks.

Examples of solvent black dyes include Solvent Black (SB) 3, SB 5, and SB 46. Ink Black B, also useful in the practice of the invention, is the trade name given by Morten International for one of their products: 50% SB46 in ethylene glycol phenyl ether. Examples of vat black dyes include Vat Black 9 and Vat Black 25. Further examples of vat black dyes include a family of dyes available under the trademark known as WAXOLINE dyes; these dyes include WAXOLINE Black 5BP 35115 and WAXOLINE Black OBP 35109. (WAXOLINE is a trademark of ICI Americas.) Examples of water-insoluble mordant black dyes include Mordant Black 1, Mordant Black 9, and Neazopon Black X52 from BASF Corp., Chemical Division (Holland, Mich.).

The oil comprises either a water-insoluble organic solvent or a water-insoluble mono or di glycol ether. Examples of water-insoluble organic solvents (oils) include non-toxic aromatics and hydrocarbons.

Examples of non-toxic aromatic compounds include toluene, xylenes, naphthalene, naphthalene sulfonates, substituted naphthalene sulfonates, phenanthrene, and anthracene.

Examples of hydrocarbons include the straight and branched hydrocarbons containing from 8 to 22 carbon atoms, inclusive (octane to isocane). Hydrocarbons containing less than about 8 carbon atoms are too volatile, and will evaporate from the ink. Hydrocarbons containing more than about 22 carbon atoms are generally not soluble in the microemulsion droplet.

Alkenes may also be employed in the practice of the invention, having up to three carbon-carbon double bonds.

Preferably, water-immiscible mono or diglycol ethers are employed in the practice of the invention. Examples of water-insoluble mono or di glycol ethers include ethylene glycol phenyl ether, propylene glycol of phenyl ether, and other aromatic-based glycol ethers.

The surfactant system comprises at least one surfactant and one cosurfactant, as defined above.

A preferred surfactant is an amine oxide, such as N,N-dimethyl-N-dodecyl amine oxide (NDAO):

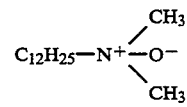

Also, in place of the $C_{12}H_{25}$-moiety, any R moiety may be used. The following moieties, their name, and abbreviation, are useful in the practice of the invention:

N,N-dimethyl-N-tetradecyl amine oxide (NTAO);
N,N-dimethyl-N-hexadecyl amine oxide (NHAO);
N,N-dimethyl-N-octadecyl amine oxide (NOAO);
N,N-dimethyl-N-(Z-9-octadecenyl)-N-amine oxide (OOAO).

However, it will be appreciated that any surfactant that gives a microemulsion may be used in the practice of the invention, so long as the oil concentration in the microemulsion is high enough to accommodate the black dye in a concentration sufficient to be useful in ink-jet printing. The determination of a given surfactant and its concentration is considered not to constitute undue experimentation, in view of the teachings of this invention.

Cosurfactants can include, but are not limited to, lactams such as 2-pyrrolidone; glycol esters such as propylene glycol laurate; mono and di glycol ethers, including ethylene glycol monobutyl ether, diethylene glycol ethers, diethylene glycol mono ethyl, butyl, hexyl ethers, propylene glycol ether, dipropylene glycol ether, and triethylene glycol ether; long chain alcohols such as butyl alcohol, pentyl alcohol, and homologous alcohols; and acetylenic polyethylene oxides.

The black inks may also include one or more cosolvents in an amount ranging from 0 to about 20 wt %; cosolvents are defined below in relation to color inks. In many instances, the cosurfactant and the cosolvent may be one and the same.

The inks may also include one or more biocides, fungicides, and/or slimicides (microbial agents), as is commonly practiced in the art. Microbial reagents include, but are not limited to, NUOSEPT (Nudex, Inc., a division of Huls America), UCARCIDE (Union Carbide), VANCIDE (RT Vanderbilt Co.), and PROXEL (ICI Americas).

All concentrations herein are in weight percent, unless otherwise indicated. The purity of all components is that employed in normal commercial practice for thermal ink-jet inks.

The microemulsion is formed by the combination of the surfactant and cosurfactant described above, the oil, and water. The microemulsion keeps the water-insoluble dye in "solution". Once the ink is printed on print media, the dye, being water-insoluble, renders the image waterfast. The ink evidences no bleed between black and any adjacent colors, primary or secondary; multipass or area depletion printing techniques are not needed.

In particular, bleed between the black ink and all the color inks is alleviated because the soluble dyes employed in the color inks remains in the aqueous environment, while the insoluble dye, which is "oil" soluble, remains in the "oil" phase until "drying" on the print substrate is complete. The term "drying" as used herein means that the ink as printed on the print media is dry to the touch, and does not imply that the ink is totally dry; total drying may require additional time.

The black inks of the invention are formulated by first combining the water-miscible components (water, surfactant, cosurfactant, and, if present, cosolvent) to form a stable solution. Next, the water-insoluble dye or dyes taken in the oil is or are added to form a mixture. The mixture is then homogenized, such as by stirring, shaking, or other means of agitating, to form the microemulsion-based ink. Attempts to formulate the ink by merely adding all the ingredients together would take too long to form the microemulsion.

For a certain known concentration ratio of surfactant to cosurfactant, the microemulsifiable oil content can be conveniently determined by titration: As long as the amount of oil added is microemulsifiable, a homogeneous phase would spontaneously form; as the limit is exceeded, the oil phase would separate out. By varying the surfactant to cosurfactant concentration ratio, one can readily determine the ratio that allows maximum amount of oil emulsified. Keeping the oil content below the maximum amount yields a stable microemulsion.

As an example, the black ink employs Ink Black B (Morten International) as the water-insoluble dye. The black dye is dissolved in ethylene glycol phenyl ether (the "oil" phase) and is then microemulsified using dimethyl octadecenyl amine oxide (the surfactant), 2-pyrrolidone (the cosurfactant and the cosolvent), and water.

Color Inks

The general, the formulation of the color inks is conventional, and forms no part of this invention. In particular, the color inks comprise one or more water-soluble dyes in a cosolvent system and water. Examples of such color inks are disclosed in U.S. Pat. No. 5,133,803, issued Jul. 28, 1992, and assigned to the same assignee as the present application. The teachings of this patent with respect to the composition of the color inks are expressly incorporated herein by reference. Typically each of the color inks (yellow, magenta and cyan inks) comprises from about 1 to 20 wt % of at least one cosolvent, from about 0.1 to 6 wt % of at least one water-soluble dye, and the balance water.

Cosolvents, a term which has been defined earlier, can include, but are not limited to, glycols such as ethylene glycol, diethylene glycol, triethylene glycol, tetraethylene glycol, propylene glycol, polyethylene glycol, polypropylene glycol, and derivatives thereof; diethylene glycol ethers, such as butyl carbitol; diols such as butanediol, pentanediol, hexanediol, and homologous diols; and other solvents such as sulfolane, esters, ketones, lactones such as γ-butyrolactone, lactams such as N-pyrrolidone, 2-pyrrolidone, and N-(2-hydroxyethyl) pyrrolidone, and glycerols and their derivatives.

Bleed Reduction between Black Ink and Color Inks

Using the water-insoluble dyes in the black ink, printed adjacent the water-soluble dyes in the color inks, prevents bleed between black and color. This is a desirable result, since the bleed between black and any color is generally worse than between one color and another.

Bleed between colors may be reduced, as here, by the use of fast drying (high dot gain) inks. For example, certain cosolvents, such as n-butyl carbitol, when used as part of the vehicle in color inks, can result in fast drying inks. Since these color inks dry quickly, bleed between colors is reduced.

The same technique, however, cannot be used to reduce bleed between black and color inks, because high dot gain inks spread on the print media, and spreading inks containing water-soluble dyes are not suitable for text (black) printing.

EXAMPLE

A black ink was formulated comprising 3.4 wt % Black B dye, 10.3 wt % phenyl ether ethylene glycol, 6 wt % OOAO, 23 wt % 2-pyrrolidone, and the balance water. A yellow ink was formulated comprising 8 wt % n-butyl carbitol, 2.5 wt % Acid Yellow 23 (AY23) yellow dye, and the balance water. For comparison, a black ink employing water-soluble black dyes was formulated according to the teachings of U.S. Pat. No. 5,062,893, issued Nov. 5, 1991, and assigned to the same assignee as the present application. The black ink comprised 2 wt % black dye mixture, 7.5 wt % 2-pyrrolidone, and the balance water.

The inks were printed adjacent each other, without using any of the existing printing techniques employed to reduce bleed.

Using a linear bleed scale of 1 to 7, with 1 being the best (no bleed) and 7 being the worst, the values listed in the Table below were obtained, based on human evaluation, on three different papers.

TABLE

| | Black-to-Yellow Bleed Values. | |
| --- | --- | --- |
| Paper | Black Ink of This Invention | Water-Soluble Black Ink |
| Gilbert Bond | 1 | 3.5 |
| Springhill | 1 | 2.5 |
| Champion Datacopy | 1 | 5 |

A bleed score of ≧2.5 is considered to be unacceptable. Use of an ink containing a water-insoluble black dye in conjunction with an ink containing a water-soluble color dye is seen to be superior to use of an ink containing a water-soluble black dye.

INDUSTRIAL APPLICABILITY

The teachings of the present invention are expected to find use in black-to-color bleed control in the next generation of thermal ink-jet printers.

Thus, a combination of thermal ink-jet inks which avoid bleed between black and color inks has been disclosed. Various changes and modifications of an obvious nature may be made without departing from the spirit of the invention, and all such changes and modifications are considered to fall within the scope of the invention as defined by the appended claims.

What is claimed is:

1. A set of ink-jet inks for thermal ink-jet printing, comprising black, yellow, magenta, and cyan inks, wherein said yellow, magenta, and cyan inks include water-soluble dyes and wherein said black ink comprises at least one water-insoluble dye in a microemulsion.

2. The set of ink-jet inks of claim 1 wherein:
   (a) said black ink comprises:
      (1) about 1 to 35 wt % of at least two surfactants, comprising about 0.5 to 15 wt % of at least one surfactant and about 0.5 to 20 wt % of at least one cosurfactant,
      (2) from 0 to about 20 wt % of at least one cosolvent,
      (3) about 0.1 to 6 wt % of at least one water-insoluble black dye,
      (4) about 0.5 to 20 wt % of an oil, and
      (5) the balance water; and
   (b) wherein each of said yellow magenta and cyan inks comprises:
      (1) from about 1 to 20 wt % of at least one cosolvent,
      (2) from about 0.1 to 6 wt % of at least one water-soluble dye, and
      (3) the balance water.

3. The set of ink-jet inks of claim 2 wherein said at least one surfactant is an amine oxide.

4. The set of ink-jet inks of claim 3 wherein said amine oxide is selected from the group consisting of N,N-dimethyl-N-(Z-9-octadecenyl)-N-amine oxide, N,N-dimethyl-N-dodecyl amine oxide, N,N-dimethyl-N-tetradecyl amine oxide, N,N-dimethyl-N-hexadecyl amine oxide, and N,N-dimethyl-N-octadecyl amine oxide.

5. The set of ink-jet inks of claim 2 wherein said at least one cosurfactant is selected from the group consisting of lactams, glycol esters, mono and di glycol ethers, diethylene glycol ethers, long chain alcohols, and acetylenic polyethylene oxides.

6. The set of ink-jet inks of claim 5 wherein said lactam comprises 2-pyrrolidone; said glycol esters are selected from the group consisting of propylene glycol laurate; said mono and di glycol ethers are selected from the group consisting of ethylene glycol monobutyl ether, diethylene glycol ethers, diethylene glycol mono ethyl ether, diethylene glycol mono butyl ether, diethylene glycol mono hexyl ether, propylene glycol ether, dipropylene glycol ether, and triethylene glycol ether; and said long chain alcohols are selected from the group consisting of butyl alcohol, pentyl alcohol, and homologous alcohols.

7. The set of ink-jet inks of claim 2 wherein said oil is selected from the group consisting of non-toxic aromatics, straight and simple branched hydrocarbons having from about 8 to 22 carbon atoms, alkenes having up to three carbon-carbon double bonds, and water-immiscible mono and di glycol ethers.

8. The set of ink-jet inks of claim 7 wherein said non-toxic aromatics are selected from the group consisting of toluene, xylenes, naphthalene, naphthalene sulfonates, substituted naphthalene sulfonates, phenanthrene, and anthracene.

9. The set of ink-jet inks of claim 7 wherein said mono and di glycol ethers are selected from the group consisting of aromatic-based glycol ethers.

10. The set of ink-jet inks of claim 9 wherein said aromatic-based glycol ethers are selected from the group consisting of ethylene glycol phenyl ether or propylene glycol of phenyl ether.

11. The set of ink-jet inks of claim 2 wherein said at least one water-insoluble dye in said black ink is selected from the group consisting of solvent black dyes, vat black dyes, and mordant black dyes.

12. The set of inks of claim 2 wherein said at least one cosolvent is selected from the group consisting of glycols, diethylene glycol ethers, diols, sulfolane, esters, ketones, lactones, lactams, and glycerols and their derivatives.

13. The set of ink-jet inks of claim 12 wherein said glycols are selected from the group consisting of ethylene glycol, diethylene glycol, triethylene glycol, tetraethylene glycol, propylene glycol, polyethylene glycol, polypropylene glycol, and derivatives thereof; said diethylene glycol ether comprises butyl carbitol; said diols are selected from the group consisting of butanediol, pentanediol, hexanediol, and homologous diols; said lactone comprises γ-butyrolactone; and said lactams are selected from the group consisting of N-pyrrolidone, 2-pyrrolidone, and N-(2-hydroxyethyl) pyrrolidone.

14. A method of reducing bleed between black and color inks in thermal ink-jet printers comprising printing onto a print medium from a color set comprising black, yellow, magenta, and cyan inks, wherein said yellow, magenta, and cyan inks include water-soluble dyes and wherein said black ink comprises at least one water-insoluble dye in a microemulsion.

15. The method of claim 14 wherein:
   (a) said black ink comprises:
      (1) about 1 to 35 wt % of at least two surfactants, comprising about 0.5 to 15 wt % of at least one surfactant and about 0.5 to 20 wt % of at least one cosurfactant,
      (2) from 0 to about 20 wt % of at least one cosolvent,
      (3) about 0.1 to 6 wt % of at least one water-insoluble black dye,
      (4) about 0.5 to 20 wt % of an oil, and
      (5) the balance water; and
   (b) wherein each of said color inks comprises:
      (1) from about 1 to 20 wt % of at least one cosolvent,
      (2) from about 0.1 to 6 wt % of at least one water-soluble dye, and
      (3) the balance water.

* * * * *